May 6, 1924.
H. R. STRAIGHT
1,492,864
DEVICE FOR HANDLING AND ARRANGING BRICK
Filed Oct. 8, 1920 2 Sheets-Sheet 1
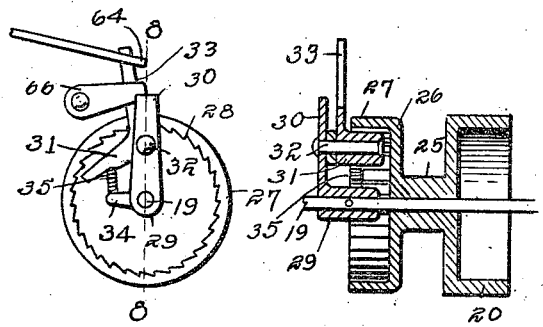
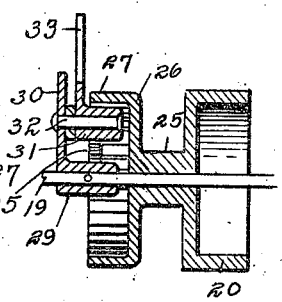
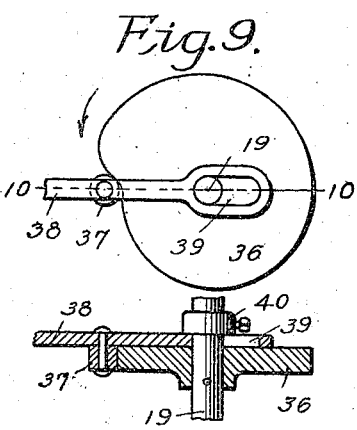
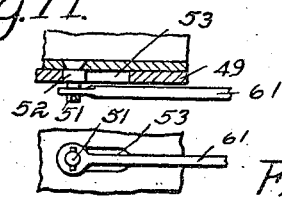
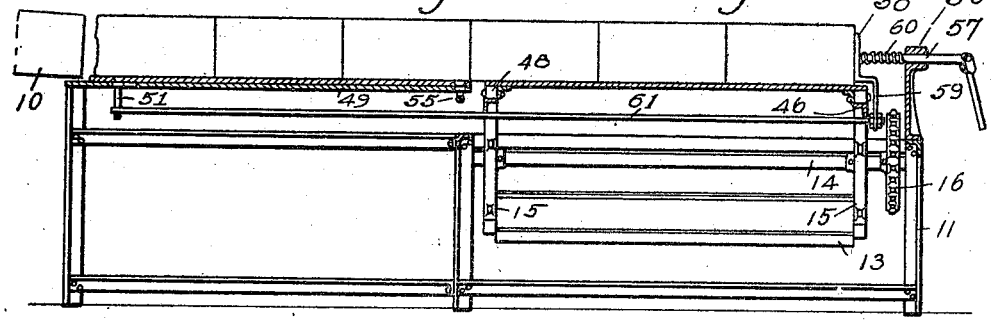
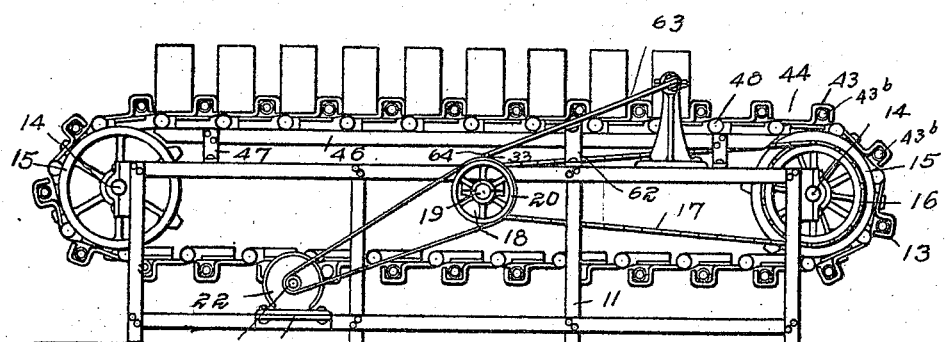
Inventor
Halver R. Straight
by Orwig & Hague attys May 6, 1924.
H. R. STRAIGHT
1,492,864
DEVICE FOR HANDLING AND ARRANGING BRICK
Filed Oct. 8, 1920  2 Sheets-Sheet 2
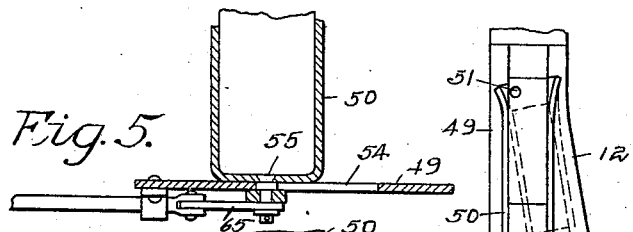
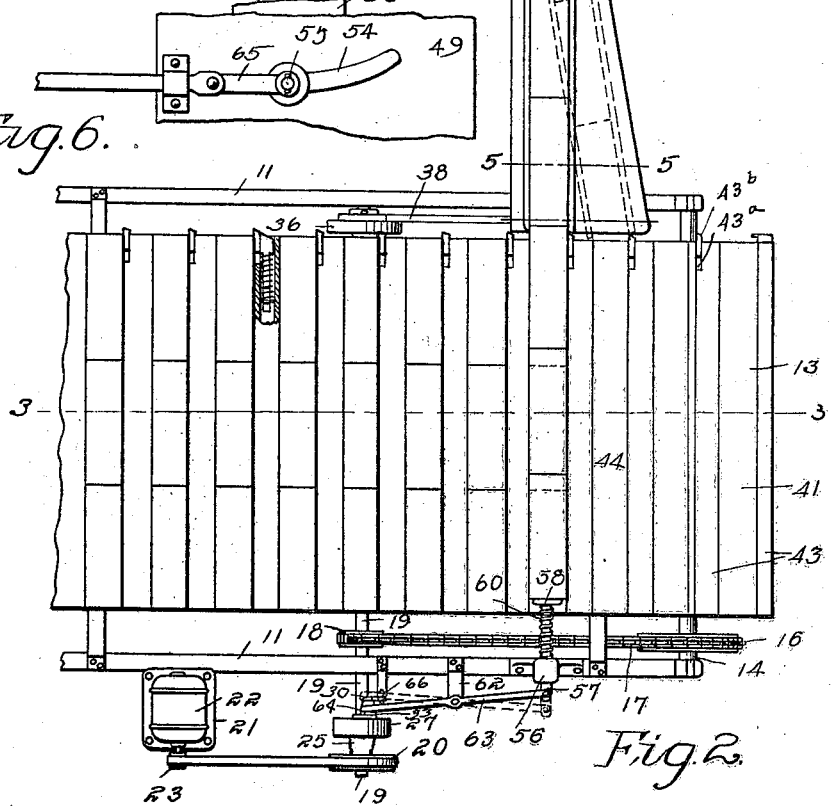
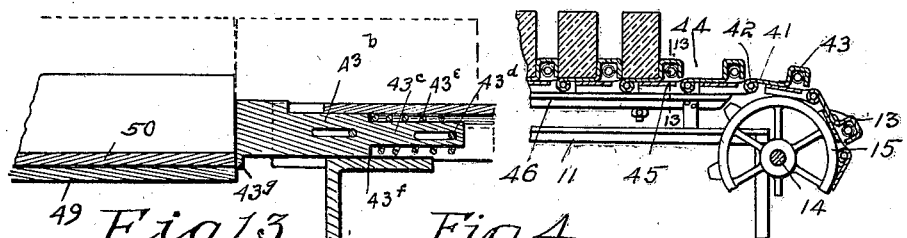

Patented May 6, 1924.

1,492,864

UNITED STATES PATENT OFFICE.

HALVER R. STRAIGHT, OF ADEL, IOWA.

DEVICE FOR HANDLING AND ARRANGING BRICK.

Application filed October 8, 1920. Serial No. 415,663.

*To all whom it may concern:*

Be it known that I, HALVER R. STRAIGHT, a citizen of the United States, and resident of Adel, in the county of Dallas and State of Iowa, have invented a certain new and useful Device for Handling and Arranging Brick, of which the following is a specification.

This invention relates to devices for handling plastic brick, and is designed to be used in connection with machinery for forming the brick. This machinery for forming the brick comprises means for granulating, grinding and pugging the material to a plastic condition, after which it is passed through a device having a screw which is designed to force the material through a die, the die being provided with a rectangular opening through which the material is forced by the said screw. This provides a continuously moving column of plastic material, which is then cut into the proper lengths by a special machine for that purpose. The die to which this machine is adapted, is substantially two and one-half inches wide and four inches high. The bricks are then cut in lengths of approximately eight and one-half or nine inches.

After the bricks have been cut into the proper lengths, they are forced onto a chute. Ordinarily these bricks are removed from the chute by hand, and placed on suitable cars for drying. I have described in my copending application for patent on a device for handling plastic brick, filed July 6, 1920, Serial Number 394,345, a device which is designed to mechanically remove the brick and place them on cars. In connection with this mechanism, it is necessary to arrange the bricks in a series of parallel rows spaced equidistant apart so that the handling device may simultaneously grasp a group of the bricks.

It is, therefore, the object of my present invention to provide mechanical means whereby the bricks from the constantly moving row of adjacent bricks may be automatically placed or arranged horizontally in a series of equidistant and parallel rows, each row having an equal number of bricks, this operation being performed without stopping or interrupting the continuous movement of the said row of bricks.

My invention consists in the construction, arrangement and combination of the various parts of the device, whereby the objects contemplated are attained, as hereinafter more fully set forth, pointed out in my claims, and illustrated in the accompanying drawings, in which:

Figure 1 is a side elevation of my device, showing a number of rows of bricks in position.

Figure 2 is a plan elevation of one end of my device.

Figure 3 is a longitudinal sectional view, taken on the line 3—3 of Figure 2.

Figure 4 is a detail sectional view, showing one of the drive sprockets and the manner in which it engages the apron conveyor, and also the construction of said conveyor.

Figure 5 is a detail sectional view, taken on the line 5—5 of Figure 3.

Figure 6 is a bottom elevation of the detail illustrated in Figure 5.

Figure 7 is a detail view, showing the trip device for automatically throwing a certain part of the mechanism in operation.

Figure 8 shows a sectional view, taken on the line 8—8 of Figure 7.

Figure 9 shows a side elevation of the cam device for operating the transfer conveyor.

Figure 10 is a sectional view taken on the line 10—10 of Figure 9.

Figure 11 is a detail sectional view, showing the pivot construction for the transfer conveyor.

Figure 12 is a bottom elevation of the detail shown in Figure 11; and

Figure 13 is a detail sectional view taken on the line 13—13 of Figure 4, showing one of the supporting devices for protecting the ends of the plastic bricks as they are moved relative to each other.

My device comprises substantially a chute 10, which is designed to receive the material from the cutting device above referred to, the bricks being moved edgewise in said chute. The chute 10 is oiled, as is customary in machines of this kind.

These bricks, as before described, are fed in a continuously moving column without interruption. I have arranged a frame 11, upon which is mounted a transfer conveyor device 12 and an apron conveyor 13. The apron conveyor is so constructed as to be provided with a series of transverse grooves into which the bricks enter from the transfer conveyor device 12. After one of these grooves has become filled with brick, the transfer conveyor is moved to an adjacent groove to permit the brick to be fed therein. This operation takes place simultaneously with the continuous movement of the column of brick. The apron conveyor is then advanced a distance equal to the spacing of a groove in said conveyor. The conveyor 13 is of such length that this operation may be repeated a number of times, so that a series of these rows may be supported on said conveyor, there being an equal number of brick in each row, spaced equidistant apart, so that they may be removed from said conveyor by the mechanism described in my copending application above referred to.

To accomplish this series of operations, I have mounted on the frame 11 shafts 14, each of said shafts being provided with a sprocket wheel 15 at each end. One of the shafts 14 is provided with a smaller sprocket wheel 16, which is designed to carry a chain 17, said chain being driven from a sprocket 18 mounted on the midway transverse shaft 19. This shaft 19 is provided with a loosely mounted pulley 20. The lower part of the frame 11 is provided with a bracket 21, on which is mounted a motor 22. The motor 22 is provided with a belt wheel 23, designed to carry a belt 24 which is designed to be operatively connected with the pulley 20, as illustrated in Figures 1 and 2.

The pulley 20 is provided with a sleeve 25, which has on its inner end a disc 26 provided with a peripheral flange 27, the inner face of said flange being provided with a series of ratchet teeth 28. The shaft 19 is provided with a fixed sleeve 29, said sleeve having a radially projecting arm 30 designed to carry a pawl device 31, said pawl being pivoted thereto by means of a rivet 32. The pawl 31 is so arranged as to engage the teeth 28, and is provided with a radially projecting arm 33. One side of the member 29 is provided with a projection 34, which is designed to carry a spring 35. The spring 35 is for the purpose of yieldingly holding the pawl 31 into engagement with the ratchet teeth 28.

The purpose of this trip device is made clear in the description of the practical operation.

The opposite end of the shaft 19 is provided with a cam 36, designed to coact with a roller 37 mounted on a slide bar 38, said slide bar being provided with a groove 39 surrounding the shaft 19. A collar 40 prevents side movement of the slide bar.

The apron 13 preferably comprises a series of sheet metal plates 41, rolled at one edge and designed to receive a pin 42, and provided at the opposite edge with an upwardly projecting member 43. These members 43 are provided with parallel faces arranged at right angles to the plate 41, in such a manner that a groove 44 is provided when the plates 41 are in a horizontal position. These grooves 44 are slightly wider than the width of the brick, and are polished and oiled. The mechanism for oiling these plates is not shown, as this is common to machines of this kind. Ordinarily enough oil is carried by the incoming brick to answer the purpose.

The pins 42 are secured in chain members 45, which are designed to coact with the sprockets 15 and provide flexibility for the said apron. The chain members 45 travel on guides 46 secured to the frame 11 by means of brackets 47, the members 45 being provided with rollers 48.

Each of the members 43 is provided at one end with a slot 43$^a$, as clearly shown in Figure 2 of the drawings. For preventing the edges of the brick from being broken off as one of the bricks is moved transversely relative to the other, as hereinafter more fully described, I have provided a bar 43$^b$ having a cylindrical member 43$^c$ designed to extend in between the vertical faces of the member 43. The said member 43$^c$ is slidably mounted therein by means of pins 43$^d$. For forcing the said member to its outer limit of movement, I have provided a spring 43$^e$, one end of which lies against a shoulder 43$^f$, and the opposite end against the pin 43$^d$. The member 43$^c$ is provided with a downwardly projecting member 43$^g$, which is designed to be engaged by the transfer chute, as will hereinafter be described.

The frame 11 is provided with a laterally extending plate 49, on which is pivoted the transfer chute or conveyor 50. This transfer conveyor is provided with a pivot member 51, shown in detail in Figures 11 and 12, said member being riveted thereto and provided with a shoulder 52 designed to travel in a slot 53 in the plate 49. The opposite end of the plate 49 is provided with a slot 54 designed to receive a pin 55 in the bottom of the transfer conveyor 50, as illustrated in Figures 5 and 6.

Thus it will be seen that I have provided a conveyor member pivoted at one end and having its opposite end free to move in a transverse direction over the face of the plate 49, which is constructed considerably wider at its inner end than at its outer end.

Secured to one of the frame members 11, and in line with the incoming column of brick, I have provided a bracket 56, designed to carry a horizontally slidable pin 57. This pin is provided at its inner end with a plate 58 having a downwardly projecting end 59. A spring 60 is mounted on the pin 57 for the purpose of yieldingly holding the plate 58 to its inward limit of movement. The lower end of the member 59 is provided with a rod 61, and its opposite end is operatively connected with the pin 51, as illustrated in Figure 3.

Mounted upon the frame 11, midway between the bracket 56 and the shaft 19, is a bracket 62 designed to carry an inclined pivoted lever 63, the upper end of which is operatively connected with the pin 57 and the lower end provided with a hook 64. The hook 64 is so designed as to engage the upper end of the arm 33 when the device is in its normal or inoperative position, with the plate 58 at its inward limit of movement.

Pivotally secured to the forward end of the slide bar 38 is a link 65, having one end pivoted to the pin 55.

The operation of my device is as follows: Assuming that the column of brick is being continuously moved through the chute 10, and that the transverse conveyor 50 is in line with one of the grooves 44 in the position illustrated in dotted lines in Figure 2, it will be seen that as the column of brick is continuously moved, the brick will enter the said groove and engage the plate 58. It is also assumed that the motor 23 is being rotated continuously, which in turn will cause the pulley 20 to be rotated and the ratchets 28 to be rotated. The hook 64 will engage the lever 33, causing the pawl 31 to disengage the ratchet 28. This will permit the free rotation of the pulley 20 without rotating the shaft 19, the shaft 19 being held against backward movement, due to the action of the spring 35, by means of the dog 66, as illustrated in Figure 7.

When the moving column of brick has engaged the plate 58, the said plate will commence to move outwardly against the action of the spring 60, causing the rod 61 to be moved in the same direction. This in turn will pull the pin 51, causing the transfer conveyor 50 to be moved in the same direction and at the same speed as the incoming row of bricks. The hook 64 will then disengage the member 33, permitting the dog 31 to engage the ratchet 28. This will then cause the lever 30 to rotate, together with the shaft 19. The opposite end of the shaft 19, being provided with the cam 36, will cause the same cam to rotate from the position shown in Figure 9, in the direction indicated by the arrow, causing the slide bar 38 to be moved forwardly. This in turn will cause the free end of the transfer conveyor 50 to be moved forward to a position in line with the groove 44 to be filled, as shown by dotted lines in Figure 2.

This transverse movement of the conveyor 50 will cause one end of the brick in the outer end of the said conveyor to be slid transversely across the outer end of the adjacent brick in the groove 44. This transverse movement between the adjacent faces will cause the corners of said bricks to be broken off. To prevent the corner of the brick in the groove 44 from being broken off, I have provided the member 43$^b$. This member is slidably mounted within the member 43, as before described, and is actuated through the member 43$^g$. The free end of the conveyor 50 is curved from the pivot 21, and is designed to engage said pin 43$^g$ as it is moved toward the conveyor 13, the outer end of the member 43 being just in line with the intersection of the two adjacent bricks. Thus it will be seen that as the member 50 is moved transversely, the corner of the brick in the groove 44 will be held against transverse movement by the outer end of the member 43$^a$. This member will be slid inwardly as the bricks are advanced, and at the same speed, so that the outer end is always in line with the edge of the bricks. As soon as the member 50 is returned to its normal position, the member 43 will be moved to its outer limit of movement by means of the spring 43$^e$. The corner of the brick in the chute 50 is held against being broken off by the said member of the said chute, which is of the proper length to be in line with the brick at the time they are slid transversely.

It will be seen from the drawings that the height of the members 43 is considerably less than the height of the brick, and also the height of the members 43$^a$ is substantially equal to the height of the members 43, and for that reason no protection is provided for the upper corners of said bricks. To provide against this, I have placed the said conveyor 50 on a slight angle with the bottom of the grooves 44, in such a manner that the bricks will be slightly separated at their upper ends, as illustrated in Figure 13. This permits all of the pressure to be placed at the lower edges of said bricks, the height of the members 43 being sufficient to take care of the area in which the pressure is applied.

This movement of the transfer conveyor will take place just at the time when the plate 58 has reached the position in line with the ends of the members 43. When the shaft 19 has started to rotate, the sprocket 18 will be rotated. The sprocket 18, being considerably smaller in diameter than the sprocket 15, will cause the sprocket 15 to be moved such a distance that the apron 13 will be moved rearwardly a distance equal to the spacing of the grooves 44. This movement will take place simultaneously with the forward movement of the transfer conveyor 50, and also with its rearward movement. The return movement of the member 38 and the conveyor 50 will be timed through the cam 39 in such a manner as to move rearwardly at the same speed at which the apron moves, thereby keeping the discharge end of the transfer conveyor in line with the groove 44 being filled.

It will thus be seen that the swinging movement of the transfer conveyor 50 will switch the continuously moving column of brick from one groove to an adjacent groove without interrupting the movement of said column. The plate 58 when moved to its outward limit of movement will engage the ends of the member 43 as the said member is advanced rearwardly, and hold the chute 50 in its position of movement adjacent to the apron until the new slot in the said conveyor has advanced to a position in line with the said moving column and the plate 58, at which time the said plate will move inward between the face of the member 43 a short time before the member 33 has made a complete revolution, permitting the hook 46 to engage the said member 33 and disengage the pawl 31 from the ratchet 28. The member 16 continues in its rotary motion until the next row of brick has filled its groove, after which the above operation will be repeated automatically.

Thus it will be seen that I have provided a means of comparatively simple, durable and inexpensive construction, which will automatically arrange a continuously moving column of incoming brick into a series of equidistant rows of bricks with an equal number of bricks in a row.

I claim as my invention:

1. In combination, means for conveying a continuously moving row of brick, a conveyor having a series of equidistant and transverse grooves capable of being moved transversely with respect to the row of moving brick, means for automatically and intermittently advancing said conveyor, a pivoted conveyor for transferring the brick from said moving row to one of said receiving grooves, automatic means for swinging the free end of said pivoted conveyor to transfer brick to an adjacent groove when the first said groove has become filled, and means for returning the transfer conveyor to its original position of movement simultaneously with the advance of the said transversely moving conveyor.

2. In combination, means for conveying a continuously moving row of adjacent brick, a conveyor having a series of equidistant and transverse grooves and capable of being moved transversely with respect to the row of moving brick, automatic means for advancing said conveyor, a pivoted conveyor for transferring the brick from said moving row to one of said receiving grooves, automatic means for swinging the free end of said pivoted conveyor to transfer brick to an adjacent groove when one of them has become filled.

3. In combination, means for conveying a continuously moving row of adjacent brick arranged end to end, a conveyor having a series of equidistant and transverse grooves slightly wider than the thickness of the brick and capable of being moved transversely with respect to the row of moving brick, automatic means for advancing said conveyor, a pivoted conveyor for transferring the brick from said moving row to one of said receiving grooves, and automatic means for swinging the free end of said pivoted conveyor to transfer brick to an adjacent groove when one of them has become filled.

4. In combination, means for conveying a continuously moving row of adjacent brick arranged end to end, a conveyor having a series of equidistant and transverse grooves slightly wider than the thickness of the brick and capable of being moved transversely with respect to the row of moving brick, automatic means for advancing said conveyor, a pivoted conveyor having sides and a bottom for transferring the brick from said moving row to one of said receiving grooves, and automatic means for swinging the free end of said pivoted conveyor to transfer brick to an adjacent groove when one of them has become filled.

5. In combination, a conveyor designed to carry a row of continuously moving brick, an apron conveyor designed to move transversely with respect to said row of moving brick, said apron having a series of equidistant and transverse grooves, said grooves being of such a length as to hold a number of adjacent brick, a pivoted transfer device for conveying the continuously moving row of brick to one of the grooves in said apron, a trip device, means set in motion by said trip device for swinging the free end of said transverse conveyor to an adjacent groove in said apron, and means for advancing said apron conveyor forward a distance equal to the space of said transverse grooves.

6. In combination, means for conveying a continuously moving row of adjacent brick, an apron conveyor having a series of equidistant and transverse grooves slightly wider than the thickness of the brick, said grooves being parallel with the line of movement of the said row of brick, means for intermittently imparting a transverse movement to said apron conveyor relative to the movement of said row of brick, a pivoted transfer conveyor communicating with the delivery end of the first said conveyor and the receiving end of one of said grooves, said transfer conveyor being provided with sides and a bottom and having that end from the apron conveyor pivoted, means for moving the other end of said transfer conveyor toward the forward end of said apron conveyor, and means for moving the free end of said transfer conveyor to its original position simultaneously with the advance of said apron conveyor.

7. In combination, means for conveying a continuously moving row of brick arranged end to end, an apron conveyor having a series of equidistant transverse grooves slightly wider than the thickness of a brick and capable of being moved transversely with respect to a row of moving brick, means for intermittently advancing said apron conveyor, a pivoted transfer conveyor for carrying the brick from said moving row to one of said transverse grooves, a trip device capable of being moved longitudinally by the brick within said groove, means operated by said trip device for advancing said apron conveyor, and means also operated by said trip device for moving said transfer conveyor longitudinally and simultaneously with the brick therein.

8. In combination, a conveyor designed to carry a row of continuously moving brick, an apron conveyor designed to move transversely with respect to said row of moving brick, said apron having a series of equidistant and transverse grooves, said grooves being of such length as to hold a number of adjacent brick, a pivoted transfer device for conveying the continuously moving row of brick to one of the grooves in said apron, a trip device, means set in motion by said trip device for swinging the free end of said transfer conveyor to an adjacent groove in said apron, means for advancing said apron conveyor and the free end of said transfer conveyor forward a distance equal to the space of a transverse groove, and means also actuated by said trip device for moving said transverse conveyor longitudinally with the movement of the brick therein simultaneously with the return movement of said transfer conveyor.

9. In combination, means for conveying a continuously moving row of adjacent brick arranged end to end, a conveyor having a series of equidistant and transverse grooves, said conveyor being capable of movement transversely with respect to the movement of said row of brick, means for intermittently advancing said conveyor, a pivoted conveyor for transferring the brick from said moving row to one of said transverse grooves, automatic means for swinging the free end of said pivoted conveyor to transfer brick to an adjacent groove when one of them has become filled, the free end of said transfer conveyor being adapted to swing outwardly from the adjacent edge of said first conveyor, means for simultaneously returning the free end of said transfer conveyor to its original position of movement, simultaneously with the advance of first said conveyor, and yieldable means capable of longitudinal movement with the row of advancing brick for filling the space between the free end of said transfer conveyor and the adjacent edge of the said transversely moving conveyor.

Des Moines, Iowa, August 12, 1920.

HALVER R. STRAIGHT.